United States Patent
Schieber et al.

(10) Patent No.: US 12,151,442 B1
(45) Date of Patent: Nov. 26, 2024

(54) PLIABLE MATERIAL MILLING TECHNOLOGY

(71) Applicant: Ingenarious Consultants LLC, Tustin, CA (US)

(72) Inventors: Andrew Schieber, Tustin, CA (US); Randall Takahashi, Mission Viejo, CA (US); Rem Roeun, Torrance, CA (US)

(73) Assignee: Ingenarious Consultants LLC, Tustin, CA (US)

( * ) Notice: Subject to any disclaimer, the term of this patent is extended or adjusted under 35 U.S.C. 154(b) by 0 days.

(21) Appl. No.: 17/341,539

(22) Filed: Jun. 8, 2021

Related U.S. Application Data

(60) Provisional application No. 63/036,717, filed on Jun. 9, 2020.

(51) Int. Cl.
*B29C 67/00* (2017.01)
*B29K 83/00* (2006.01)

(52) U.S. Cl.
CPC ...... *B29C 67/0048* (2013.01); *B29K 2083/00* (2013.01)

(58) Field of Classification Search
CPC .... B29C 2043/3615; B29C 2793/0054; B29C 67/0048; B29C 67/00; B29C 2793/0045; B29C 45/1344; B29C 70/74; B23Q 11/143; B23Q 11/148; B26F 1/24; B26F 3/08; B26F 1/0015; B29L 2031/72; B23P 15/00; B23B 2270/54
See application file for complete search history.

(56) References Cited

U.S. PATENT DOCUMENTS

| | | |
|---|---|---|
| 3,080,543 A | 3/1963 | Boggs |
| 3,252,122 A | 5/1966 | Baxter |
| 3,307,135 A | 2/1967 | Simmons |
| 3,678,249 A | 7/1972 | Lennox |

(Continued)

FOREIGN PATENT DOCUMENTS

| | | | | |
|---|---|---|---|---|
| CN | 103640218 A | * | 3/2014 | ......... B29C 67/0085 |
| KR | 20030062511 A | * | 7/2003 | |

(Continued)

OTHER PUBLICATIONS

Minus, M., Kumar, S. The processing, properties, and structure of carbon fibers. JOM 57, 52-58 (2005). https://doi.org/10.1007/s11837-005-0217-8 (Year: 2005).*

(Continued)

*Primary Examiner* — Timothy Kennedy
*Assistant Examiner* — Inja Song
(74) *Attorney, Agent, or Firm* — Christensen, Fonder, Dardi & Herbert PLLC; John P. Fonder

(57) ABSTRACT

The methods and apparatus disclosed in this document may be used to create parts with void features such as holes, cavities, channels, slots, and the like. In some embodiments, the void features have a large depth to width aspect ratio. In some embodiments, the void features are formed in pliable, resilient and/or elastomeric materials. In some embodiments, the void features are formed in parts comprising silicone elastomer or silicone rubber. The void features may be adapted and configured for use in medical applications, aerospace applications, electrical applications, and/or industrial applications in some embodiments.

7 Claims, 14 Drawing Sheets

(56) References Cited

U.S. PATENT DOCUMENTS

| | | |
|---|---|---|
| 3,927,301 A | 12/1975 | Heuel et al. |
| 3,946,200 A | 3/1976 | Juodikis |
| 3,988,682 A | 10/1976 | Mikonis |
| 4,409,662 A | 10/1983 | Rao |
| 4,631,626 A | 12/1986 | Bohan, Jr. |
| 4,733,049 A * | 3/1988 | Lemelson ............. B25J 19/021 |
| | | 219/121.79 |
| 4,736,091 A | 4/1988 | Moe |
| 4,763,102 A | 8/1988 | Ritt |
| 4,885,456 A | 12/1989 | Tanaka et al. |
| 4,933,535 A | 6/1990 | Zabinski |
| 4,934,831 A | 6/1990 | Volbrecht |
| 4,990,193 A | 2/1991 | Kimura |
| 5,034,595 A | 7/1991 | Grendys |
| 5,111,002 A | 5/1992 | Hollander |
| 5,176,451 A | 1/1993 | Sasada et al. |
| 5,247,158 A | 9/1993 | Steinhauser et al. |
| 5,251,981 A | 10/1993 | Kreider |
| 5,280,422 A | 1/1994 | Moe et al. |
| 5,446,437 A | 8/1995 | Bantien et al. |
| 5,575,941 A | 11/1996 | Johnson |
| 5,689,087 A | 11/1997 | Jack |
| 5,711,608 A | 1/1998 | Finney |
| 5,726,624 A | 3/1998 | Caffee et al. |
| 5,808,233 A | 9/1998 | Finkel et al. |
| 5,926,390 A | 7/1999 | Koyama |
| 5,951,900 A | 9/1999 | Smrke |
| 6,005,577 A | 12/1999 | Breitlow |
| 6,072,165 A | 6/2000 | Feldman |
| 6,124,579 A | 9/2000 | Steinhauser et al. |
| 6,409,438 B1 * | 6/2002 | Kohler ................. B23Q 16/001 |
| | | 29/559 |
| 6,414,281 B1 | 7/2002 | Long et al. |
| 6,688,532 B2 | 2/2004 | Nanno et al. |
| 7,982,580 B2 | 7/2011 | Weber et al. |
| 2007/0235416 A1 * | 10/2007 | Krug .................... B26F 1/0015 |
| | | 219/69.12 |
| 2021/0220927 A1 * | 7/2021 | Merson .................. B23B 49/02 |

FOREIGN PATENT DOCUMENTS

| | | | |
|---|---|---|---|
| KR | 20190114632 A1 * | 10/2019 | |
| WO | WO-2014184508 A1 * | 11/2014 | ............... B23B 1/00 |

OTHER PUBLICATIONS

English translation of KR-20190114632A1 by EPO. (Year: 2019).*
Wikipedia "polyvinyl chloride" https://en.wikipedia.org/w/index.php?title=Polyvinyl_chloride&oldid=957793426, available in public on May 20, 2020. (Year: 2020).*
English translation of KR-20030062511-A by EPO. (Year: 2003).*
English translation of CN-103640218-A by EPO. (Year: 2014).*

* cited by examiner

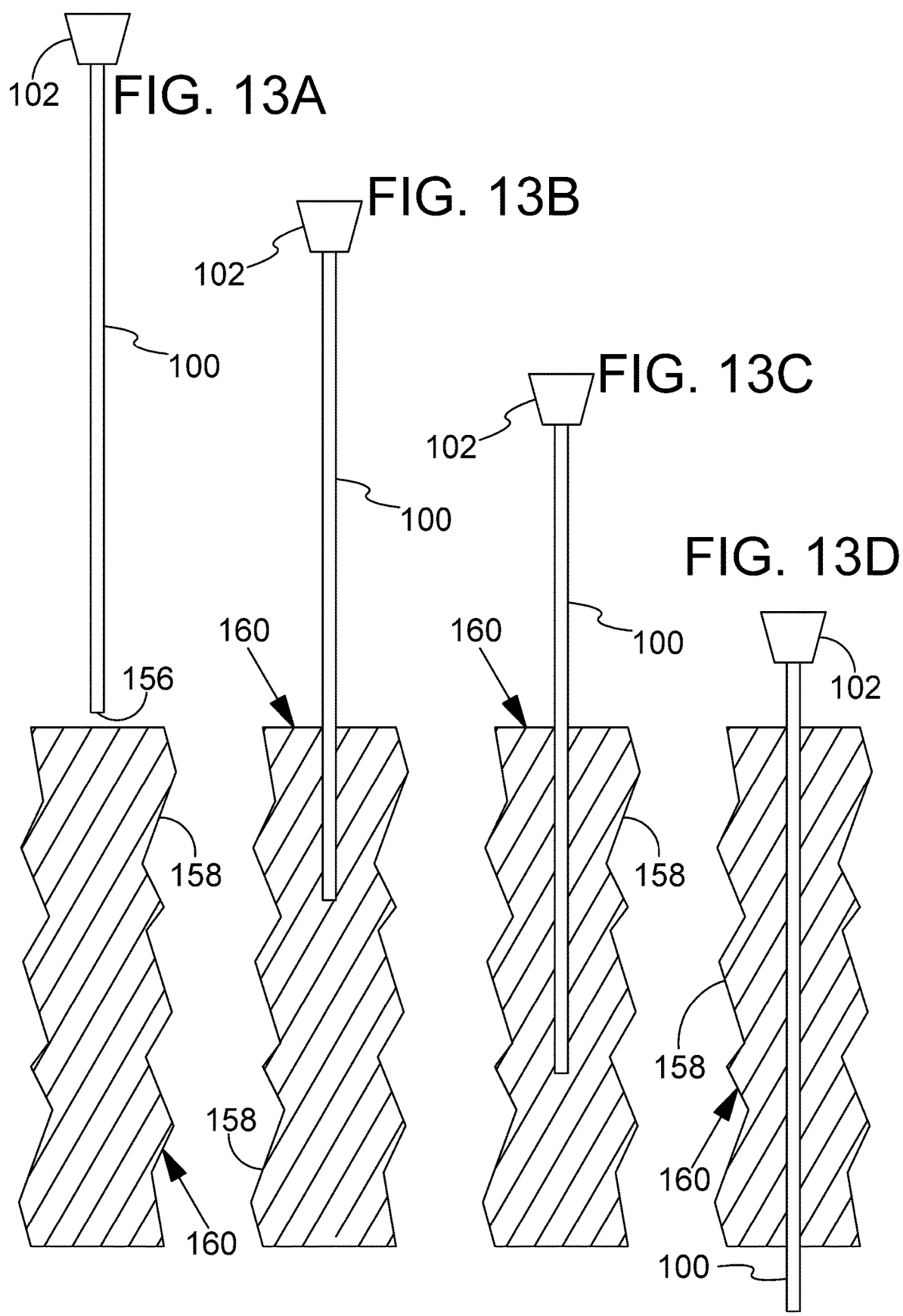

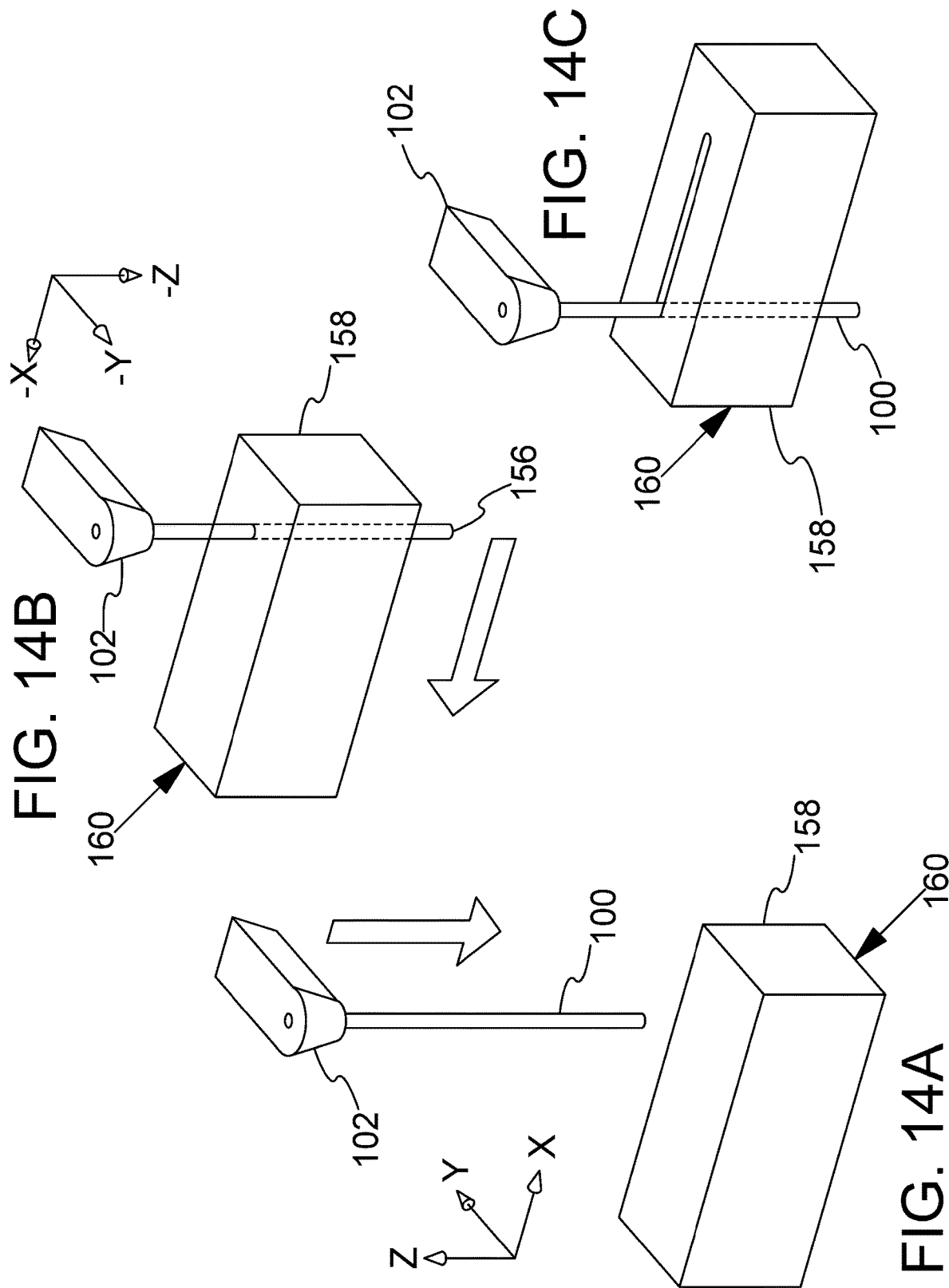

PLIABLE MATERIAL MILLING TECHNOLOGY

CROSS-REFERENCE TO RELATED APPLICATION

This application claims the benefit of U.S. Provisional Application No. 63/036,717, filed Jun. 9, 2020, the disclosure of which is incorporated by reference herein.

BACKGROUND

The presently disclosed subject matter relates generally to methods and apparatus for forming holes, slots, voids, and the like in parts and/or materials. The presently disclosed subject matter also relates generally to methods and apparatus for planning or shaping a block of material. The term "machining" is often used to refer to a process in which a material is cut into a desired final shape and size by a controlled material-removal process. Examples of conventional machining methods include drilling, grinding, milling, and turning. Examples of non-conventional machining methods include electrochemical machining (ECM), water jet cutting, laser cutting, laser drilling, and electrical discharge machining (EDM).

BRIEF SUMMARY

The methods and apparatus disclosed in this document may be used to create parts with void features such as holes, cavities, channels, slots, and the like. In some embodiments, the void features have a large depth to width aspect ratio. In some embodiments, the void features are formed in pliable, resilient and/or elastomeric materials. In some embodiments, the void features are formed in parts comprising silicone elastomer or silicone rubber. The void features may be adapted and configured for use in medical applications, aerospace applications, electrical applications, and/or industrial applications in some embodiments.

A feature and/or benefit of embodiments is the ability to form void features having a large depth to width aspect ratio. In some embodiments, the disclosed methods and apparatus are capable of forming features having an aspect ratio of depth to width that is greater than 4:1. In some embodiments, the methods and apparatus are capable of forming features having an aspect ratio of depth to width that is greater than 10:1. In some embodiments, the methods and apparatus are capable of forming features having an aspect ratio of depth to width that is greater than 15:1. In some embodiments, the methods and apparatus are capable of forming features having an aspect ratio of depth to width that is greater than 20:1.

Features and/or benefits of some embodiments include methods and apparatus that overcome shortcomings found with some laser drilling processes. In some embodiments, the methods and apparatus disclosed in this document produce holes having a cylindrical shape. For example, forming cylinder-shaped hole with a diameter of 0.008" and a depth of 0.032" via laser drilling would be difficult or impossible. In some embodiments, the methods and apparatus disclosed in this document produce holes having shapes that are not cone shaped. In some embodiments, the methods and apparatus disclosed in this document produce holes having a cylindrical shape, the cylindrical shape having a length to diameter aspect ratio greater than 4:1. In some embodiments, the methods and apparatus disclosed in this document produce holes having a cylindrical shape, the cylindrical shape having a length to diameter aspect ratio greater than 8:1. In some embodiments, the methods and apparatus disclosed in this document produce holes having a cylindrical shape, the cylindrical shape having a length to diameter aspect ratio greater than 12:1.

Features and/or benefits of some embodiments include methods and apparatus capable of forming holes having a diameter less than 0.010 inch. In some embodiments, the disclosed methods and apparatus are capable of forming holes having a diameter less than 0.006 inch. In some embodiments, the disclosed methods and apparatus are capable of forming holes having a diameter less than or equal to 0.003 inch. In some embodiments, the methods and apparatus disclosed in this document include a tool having a fixed end and a free end. In some embodiments, the methods and apparatus disclosed in this document include a tool having a free end, the tool being capable of eroding material from a workpiece while the tool extends part-way into the work piece (e.g., while the tool is not extending completely through the workpiece). In some embodiments, the methods and apparatus disclosed in this document do not require a conductor fixed at two points and electricity passing between the two point via the conductor.

Features and/or benefits of embodiments include methods and apparatus capable of forming small and/or large void features in pliable, resilient and/or elastomeric materials that overcome the shortcomings of traditional process (e.g., drilling or milling processes). In some embodiments, the methods and apparatus disclosed in this document produce holes without cutting chips of a material from a substrate. In some embodiments, the methods and apparatus disclosed in this document produce holes and other voids in a material without deflecting the material. Pliable or elastomeric materials may have the ability to flex or temporarily deform away from the drill bit or other cutting tool by utilizing their compressive and cyclic flexible material properties. In some embodiments, the methods and apparatus disclosed in this document produce holes and other voids in a material without compressing the material.

Features and/or benefits of some embodiments include methods and apparatus providing the ability to form features smaller than the tool used to create the features. In some embodiments, the methods and apparatus disclosed in this document produce holes that have a form fitting relationship with the tool shape. In some embodiments, the tool enters the material, heats the surrounding area, and is left with the material shrinking and melting from the heat. After the tool has exited the hole, what is left is a diameter and depth that is equivalent to the tool shape and entry length in some embodiments.

Features and/or benefits of embodiments also include methods and apparatus capable of forming a cylindrical hole extending along a straight axis. In some embodiments, little or no force is applied between the tool and the material so that the likelihood that the tool will drift as a hole is being formed is reduced.

Features and/or benefits of some embodiments include methods and apparatus that overcome shortcomings found in some traditional molding processes, thereby forming features that would be impossible to mold. For example, forming a 0.008" diameter hole that is 0.032" deep via molding may be difficult or impossible. Attempting to mold long aspect ratio features such as these would require an extremely thin fragile wire and/or slide. In some embodiments, the disclosed methods and apparatus provide the ability to form features larger than the tool. In some embodiments, the disclosed methods and apparatus provide the ability to drill, plane, or profile a portion of an elastomeric material. In some embodiments, an elastomeric material comprises a rubber-like material that can experience about a 7% deformation and return to the undeformed configuration. Examples of elastomeric materials include, but are not limited to, silicone, rubber (e.g., natural rubber, nitrile rubber, polysulfide rubber, etc.), thermoplastic elastomer (TPE), butyl, polyurethane, and neoprene.

The above summary is not intended to describe each illustrated embodiment or every implementation of the present disclosure.

DESCRIPTION OF THE FIGURES

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 1 is a perspective view showing a portion of an example system having a tool holder and a workpiece holder. The example system of FIG. 1 may be used to create parts with void features such as holes, cavities, channels, and the like.

FIG. 13A, FIG. 13B FIG. 13C, and FIG. 13D form a sequence of stylized cross-sectional views illustrating exemplary methods in accordance with this detailed description.

FIG. 14A, FIG. 14B and FIG. 14C form a sequence of stylized perspective views illustrating exemplary methods in accordance with this detailed description.

Figure 1:
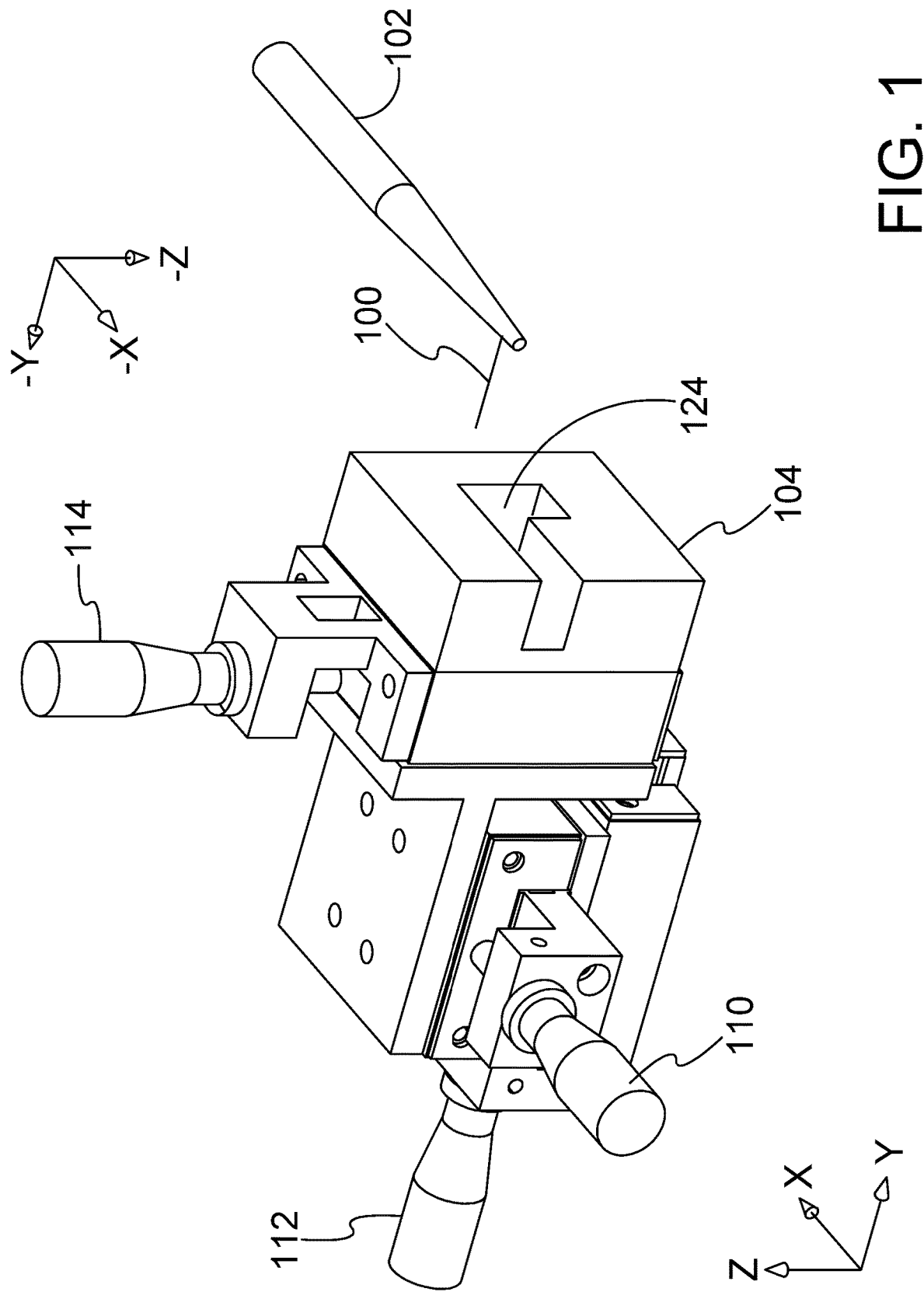

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The following detailed description should be read with reference to the drawings in which similar elements in different drawings are numbered the same. The drawings, which are not necessarily to scale, depict illustrative embodiments and are not intended to limit the scope of the invention.

FIG. 1 is a perspective view showing a portion of an example system 128 having a tool holder 102 and a workpiece holder 104. The example system 128 of FIG. 1 may be used to create parts with void features such as holes, cavities, channels, and the like. With reference to FIG. 1, it will be appreciated that the workpiece holder 104 of the system 128 defines a cavity 124. In some embodiments, the cavity 124 is dimensioned and configured to receive at least a portion of the part or workpiece. In FIG. 1 the tool holder 102 can be seen holding the tool 100 at a position near the cavity 124 defined by the workpiece holder 104. In the example embodiment of FIG. 1, the tool 100 is positioned opposite one side of the workpiece holder 104. In some embodiments, the tool holder 102 of the system 128 supports a tool heater 120 and a tool temperature sensor 122. The example system 128 of FIG. 1 includes a motion control mechanism 126 capable of producing relative motion between the workpiece holder 104 and the tool 100.

With continuing reference to FIG. 1, it will be appreciated that the motion control mechanism 126 includes an X-axis positioner 110, a Y-axis positioner 112 and a Z-axis positioner 114. In the example embodiment of FIG. 1, the X-axis positioner 110 of the motion control mechanism 126 is fixed to an upper surface of the Y-axis positioner 112. Also in the example embodiment of FIG. 1, the Y-axis positioner 112 of the motion control mechanism 126 is coupled to the Z-axis positioner 114 via a bracket. The X-axis positioner 110, the Y-axis positioner 112 and the Z-axis positioner 114 cooperate to move the workpiece holder 104 to a desired position. The X-axis positioner 110, the Y-axis positioner 112 and the Z-axis positioner 114 also cooperate to provide relative motion between the workpiece holder 104 and the tool 100.

Figure 2:
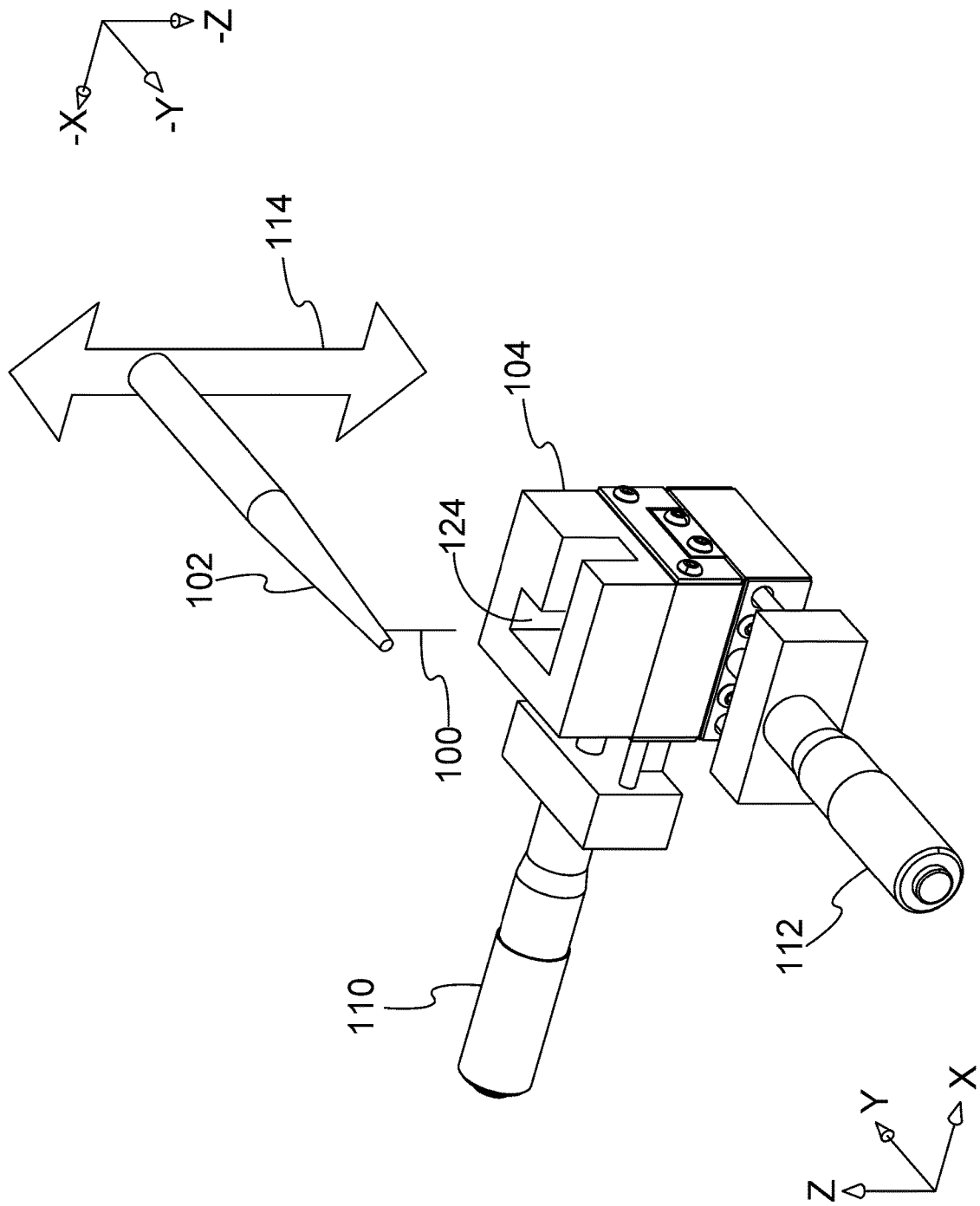
FIG. 2 is a perspective view showing a portion of an example system having a tool holder and a workpiece holder.

FIG. 2 is a perspective view showing a portion of an example system 128 having a tool holder 102 and a workpiece holder 104. The example system 128 of FIG. 2 may be used to create parts with void features such as holes, cavities, channels, and the like. In some embodiments, the tool holder 102 of the system 128 supports a tool heater 120 and a tool temperature sensor 122. With reference to FIG. 2, it will be appreciated that the workpiece holder 104 of the system 128 defines a cavity 124. In some embodiments, the cavity 124 is dimensioned and configured to receive at least a portion of the part or workpiece. In FIG. 2 the tool holder 102 can be seen holding the tool 100 at a position near the cavity 124 defined by the workpiece holder 104. In the example embodiment of FIG. 2, the tool 100 is positioned above the cavity 124 of the workpiece holder 104.

The example system 128 of FIG. 2 includes a motion control mechanism 126 capable of producing relative motion between the workpiece holder 104 and the tool 100. Accordingly, the relative positions of the workpiece holder 104 and the tool 100 can be different than the example positions shown in FIG. 2. With reference to FIG. 2, it will be appreciated that the motion control mechanism 126 includes an X-axis positioner 110 and a Y-axis positioner 112 that support the workpiece holder 104. In the embodiment of FIG. 2, the motion control mechanism 126 also includes a Z-axis positioner 114 that supports the tool holder 102. The X-axis positioner 110, the Y-axis positioner 112 and the Z-axis positioner 114 may cooperate to provide relative motion between the workpiece holder 104 and the tool 100 in the example embodiment of FIG. 2.

FIG. 3A is a perspective view showing an example system 128 comprising a stand 144, a workpiece holder 104, and a tool holder 102. In the example embodiment of FIG. 3A, the stand 144 comprises a base portion 146 supporting the workpiece holder 104 and a support portion 148 supporting the tool holder 102. In some embodiments, the tool holder 102 of the system 128 supports a tool heater 120 and a tool temperature sensor 122. The example system 128 of FIG. 3A may be used to create parts with void features such as holes, cavities, channels, and the like.

With reference to FIG. 3A, it will be appreciated that an XY table 150 of the system 128 is positioned between the base portion 146 and the workpiece holder 104. The XY table 150 comprises an X-axis positioner 110 and a Y-axis positioner 112 in the example embodiment of FIG. 3A. The workpiece holder 104 defines a cavity 124 in the example embodiment of FIG. 3A. In some embodiments, the cavity 124 is dimensioned and configured to receive at least a portion of the part or workpiece.

The tool 100 can be seen at a position above the cavity 124 of the workpiece holder 104 in FIG. 3A. The tool holder 102 is coupled to a Z-axis positioner 114 in the example embodiment of FIG. 3A. The Z-axis positioner 114, the X-axis positioner 110 and the Y-axis positioner 112 form a motion control mechanism 126 of the system 128 in the example embodiment of FIG. 3A. In some embodiments, the motion control mechanism 126 capable of producing relative motion between the workpiece holder 104 and the tool 100. Accordingly, the relative positions of the workpiece holder 104 and the tool 100 can be different than the example positions shown in FIG. 3A.

Figure 3:
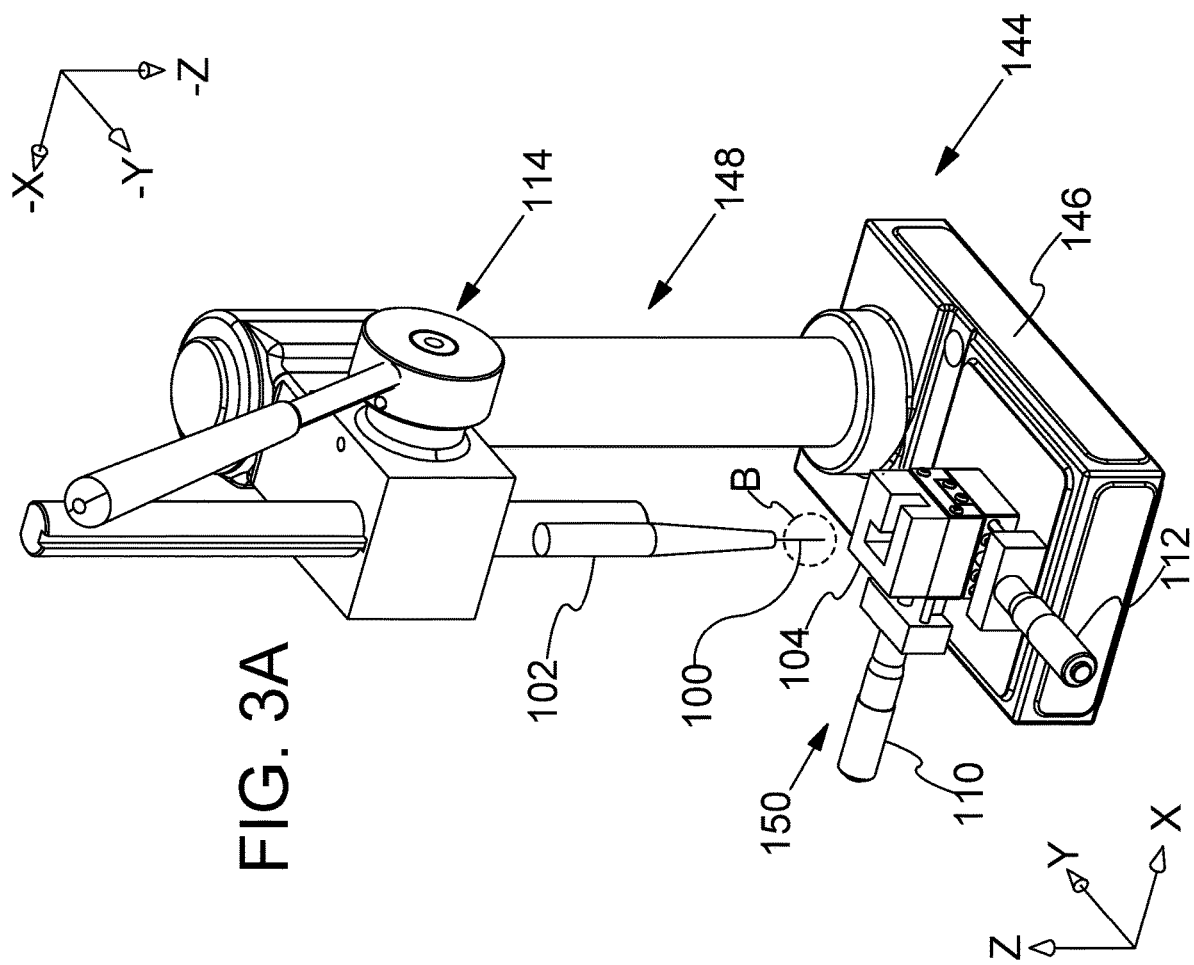
FIG. 3A is a perspective view showing an example system comprising a stand, a workpiece holder, and a tool holder.
FIG. 3B is an enlarged perspective view further illustrating the tool of the system 128 shown in FIG. 3A.

FIG. 3B is an enlarged perspective view further illustrating the tool 100 of the system 128 shown in FIG. 3A. FIG. 3A and FIG. 3B may be collectively referred to as FIG. 3. With reference to FIG. 3B, it will be appreciated that tool 100 comprises a tool body 152 having a shape corresponding to a cylinder. In the example embodiment of FIG. 3, the tool body 152 of tool 100 has a flat proximal surface 154 and a flat distal surface 156.

Figure 4:
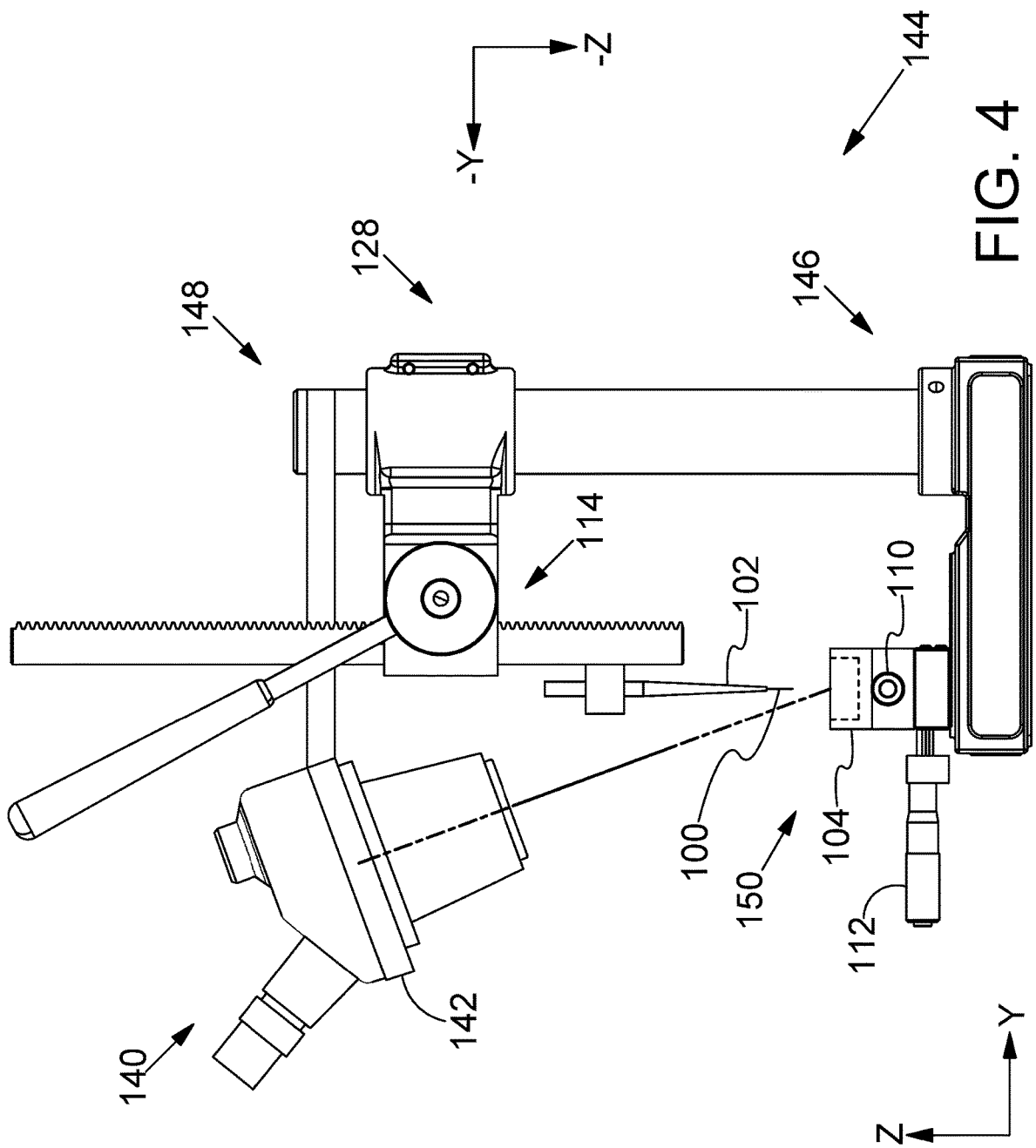
FIG. 4 is an elevation view showing an example system comprising a stand, a workpiece holder, and a tool holder.

FIG. 4 is an elevation view showing an example system 128 comprising a stand 144 supporting a tool holder 102 and a viewing instrument 140. In the example embodiment of FIG. 4, the stand 144 comprises a base portion 146 supporting a workpiece holder 104 and a support portion 148. The workpiece holder 104 defines a cavity 124 in the example embodiment of FIG. 4. In some embodiments, the cavity 124 is dimensioned and configured to receive at least a portion of the part or workpiece.

In the example embodiment of FIG. 4, the tool holder 102 of the system 128 supports a tool 100 at a location above the cavity 124 defined by the workpiece holder 104. The part/workpiece may be held in the workpiece holder 104 and the tool 100 may be used to create parts with void features such as holes, cavities, channels, and the like. In the example embodiment of FIG. 4, the tool 100 and an upper surface of the workpiece holder 104 are within a field of view of the viewing instrument 140. An example line of sight of the viewing instrument 140 is illustrated with a dashed line in FIG. 4. In the example embodiment of FIG. 4, the viewing instrument 140 comprises a binocular inspection scope 142.

With reference to FIG. 4, it will be appreciated that an XY table 150 of the system 128 is positioned between the workpiece holder 104 and the base portion 146 of the stand 144. The XY table 150 comprises an X-axis positioner 110 and a Y-axis positioner 112 in the example embodiment of FIG. 4. The tool holder 102 is coupled to a Z-axis positioner 114 in the example embodiment of FIG. 4. The Z-axis positioner 114, the X-axis positioner 110 and the Y-axis positioner 112 form a motion control mechanism 126 of the system 128 in the example embodiment of FIG. 4. In some embodiments, the motion control mechanism 126 capable of producing relative motion between the workpiece holder 104 and the tool 100. Accordingly, the relative positions of the workpiece holder 104 and the tool 100 can be different than the example positions shown in FIG. 4.

Figure 5:
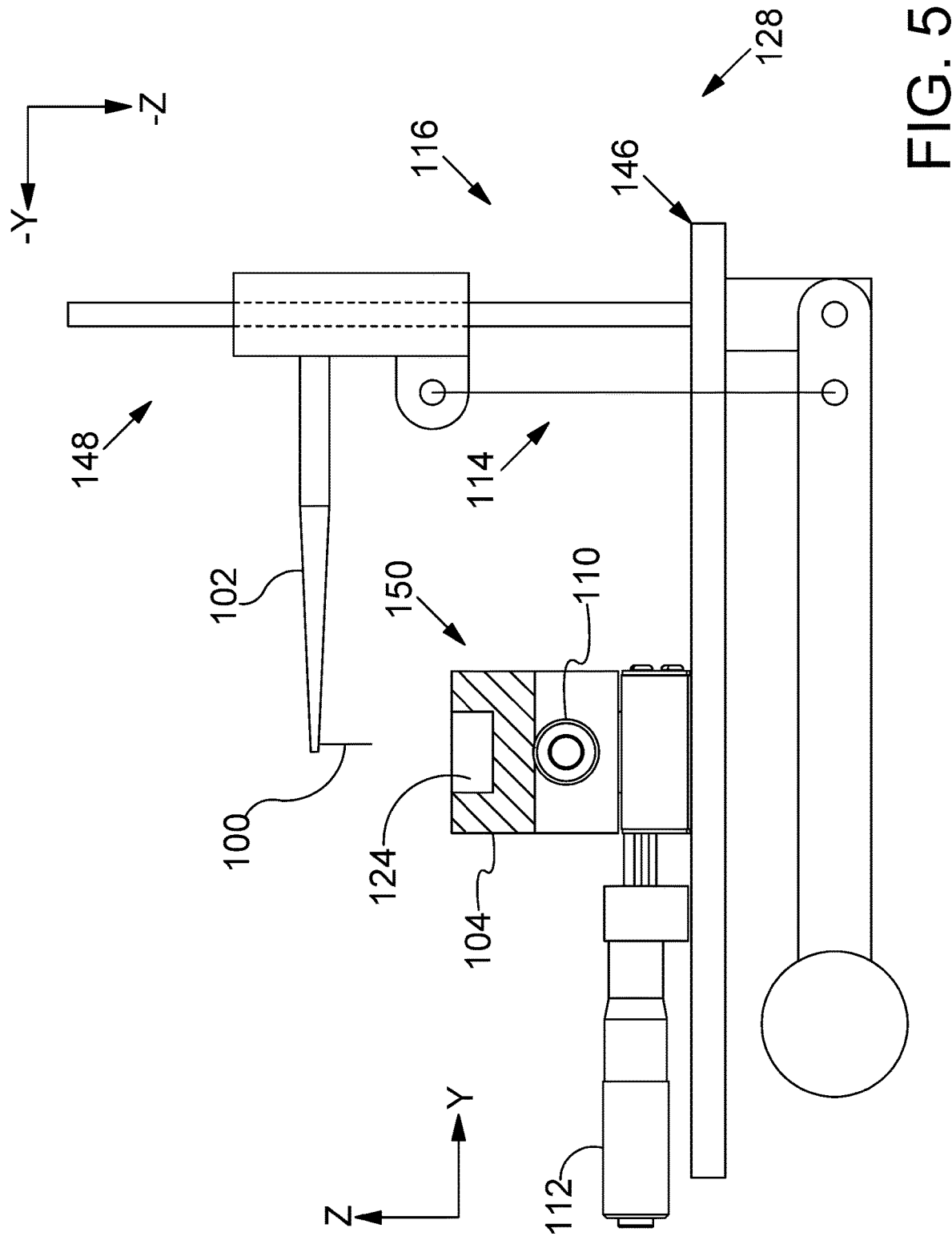
FIG. 5 is an elevation view showing an example system comprising a chassis supporting a tool holder and a viewing instrument.

FIG. 5 is an elevation view showing an example system 128 comprising a chassis 116 supporting a tool holder 102 and a workpiece holder 104. In the example embodiment of FIG. 5, the chassis 116 comprises a base portion 146 supporting the workpiece holder 104 and a support portion 148 supporting the tool holder 102. The workpiece holder 104 defines a cavity 124 in the example embodiment of FIG. 5. In some embodiments, the cavity 124 is dimensioned and configured to receive at least a portion of the part or workpiece. In the example embodiment of FIG. 5, the tool holder 102 of the system 128 supports a tool 100 at a location above the cavity 124 defined by the workpiece holder 104. The part/workpiece may be held in the workpiece holder 104 and the tool 100 may be used to create parts with void features such as holes, cavities, channels, and the like. With reference to FIG. 5, it will be appreciated that an XY table 150 of the system 128 is positioned between the workpiece holder 104 and the base portion 146 of the chassis 116. The XY table 150 comprises an X-axis positioner 110 and a Y-axis positioner 112 in the example embodiment of FIG. 5. The tool holder 102 is coupled to a Z-axis positioner 114 that is supported by the chassis 116 in the example embodiment of FIG. 5. The Z-axis positioner 114, the X-axis positioner 110 and the Y-axis positioner 112 form a motion control mechanism 126 of the system 128 in the example embodiment of FIG. 5. In some embodiments, the motion control mechanism 126 capable of producing relative motion between the workpiece holder 104 and the tool 100. Accordingly, the relative positions of the workpiece holder 104 and the tool 100 can be different than the example positions shown in FIG. 5.

Figure 6:
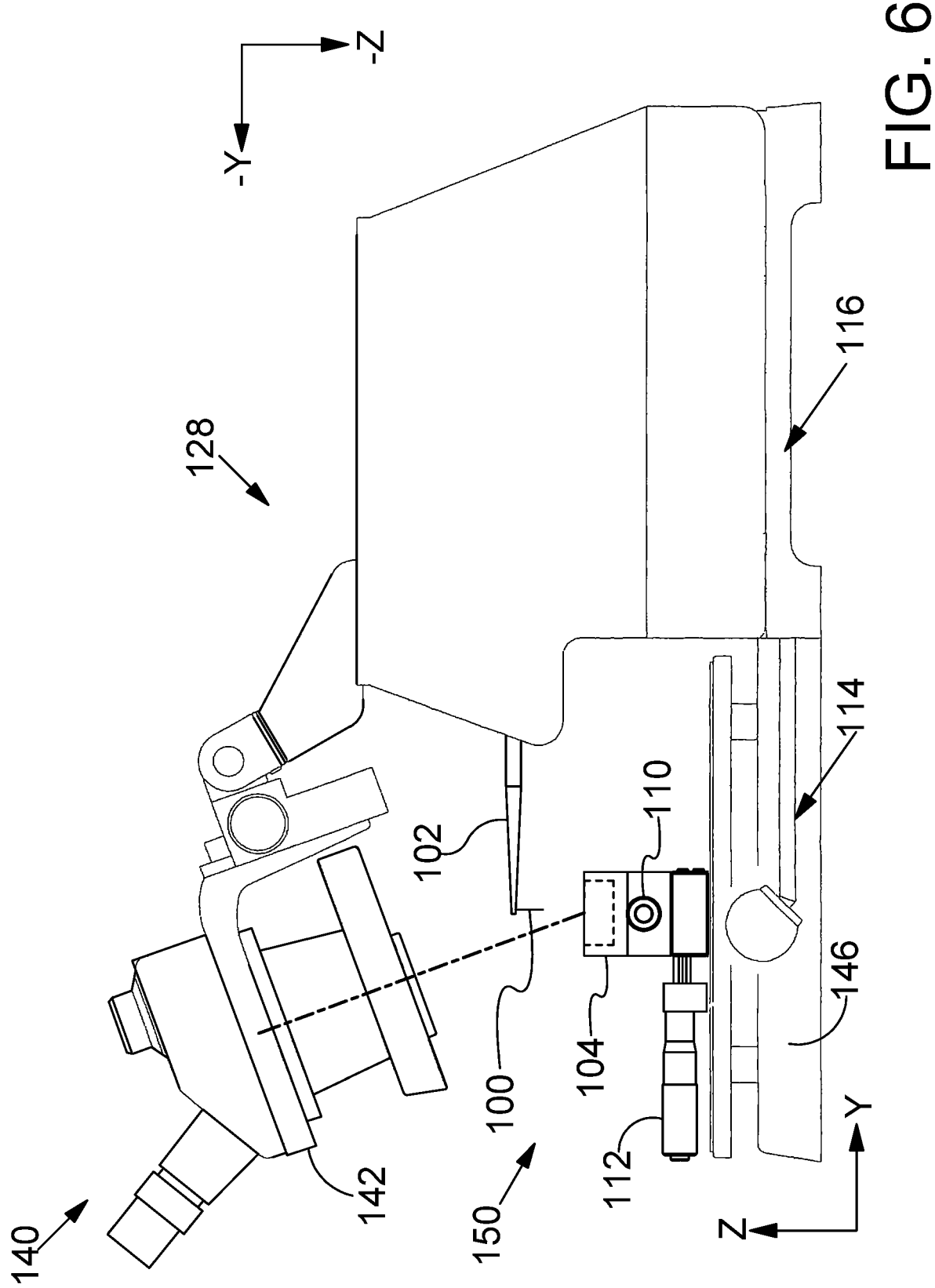
FIG. 6 is an elevation view showing an example system comprising a chassis supporting a tool holder and a viewing instrument.

FIG. 6 is an elevation view showing an example system 128 comprising a chassis 116 supporting a tool holder 102 and a viewing instrument 140. In the example embodiment of FIG. 6, the chassis 116 comprises a base portion 146 supporting a workpiece holder 104. The workpiece holder 104 defines a cavity 124 in the example embodiment of FIG. 6. In some embodiments, the cavity 124 is dimensioned and configured to receive at least a portion of the part or workpiece.

In the example embodiment of FIG. 6, the tool holder 102 of the system 128 supports a tool 100 at a location above the cavity 124 defined by the workpiece holder 104. The part/workpiece may be held in the workpiece holder 104 and the tool 100 may be used to create parts with void features such as holes, cavities, channels, and the like. In the example embodiment of FIG. 6, the tool 100 and an upper surface of the workpiece holder 104 are within a field of view of the viewing instrument 140. An example line of sight of the viewing instrument 140 is illustrated with a dashed line in FIG. 6. In the example embodiment of FIG. 6, the viewing instrument 140 comprises a binocular inspection scope 142.

With reference to FIG. 6, it will be appreciated that an XY table 150 of the system 128 is positioned between the workpiece holder 104 and the base portion 146 of the chassis 116. The XY table 150 comprises an X-axis positioner 110 and a Y-axis positioner 112 in the example embodiment of FIG. 6. The tool holder 102 is coupled to a Z-axis positioner 114 that is supported by the chassis 116 in the example embodiment of FIG. 6. The Z-axis positioner 114, the X-axis positioner 110 and the Y-axis positioner 112 form a motion control mechanism 126 of the system 128 in the example embodiment of FIG. 6. In some embodiments, the motion control mechanism 126 capable of producing relative motion between the workpiece holder 104 and the tool 100. Accordingly, the relative positions of the workpiece holder 104 and the tool 100 can be different than the example positions shown in FIG. 6.

Referring to FIGS. 1, 2, 3, and 6, an upward direction Z and a downward or lower direction –Z are illustrated using arrows labeled "Z" and "–Z," respectively. A forward direction Y and a rearward direction –Y are illustrated using arrows labeled "Y" and "–Y," respectively. A first lateral direction X and a second lateral direct –X are illustrated using arrows labeled "X" and "–X," respectively. The directions illustrated using these arrows are applicable to the apparatus shown and discussed throughout this application. The second lateral direction may also be referred to as a leftward direction. The first lateral direction may also be referred to as a rightward direction. In one or more embodiments, the upward direction is generally opposite the downward direction. In one or more embodiments, the upward direction and the downward direction are both generally orthogonal to an XY plane defined by the forward direction and the first lateral direction. In one or more embodiments, the forward direction is generally opposite the rearward direction. In one or more embodiments, the forward direction and the rearward direction are both generally orthogonal to a ZX plane defined by the upward direction and the first lateral direction. In one or more embodiments, the first lateral direction is generally opposite the second lateral direction. In one or more embodiments, first lateral direction and the second lateral direction are both generally orthogonal to a ZY plane defined by the upward direction and the forward direction. Various direction-indicating terms are used herein as a convenient way to discuss the objects shown in the figures. It will be appreciated that many direction indicating terms are related to the instant orientation of the object being described. It will also be appreciated that the objects described herein may assume various orientations without deviating from the spirit and scope of this detailed description. Accordingly, direction-indicating terms such as "upwardly," "downwardly," "forwardly," "backwardly," should not be interpreted to limit the scope of the invention recited in the attached claims.

Figure 7:
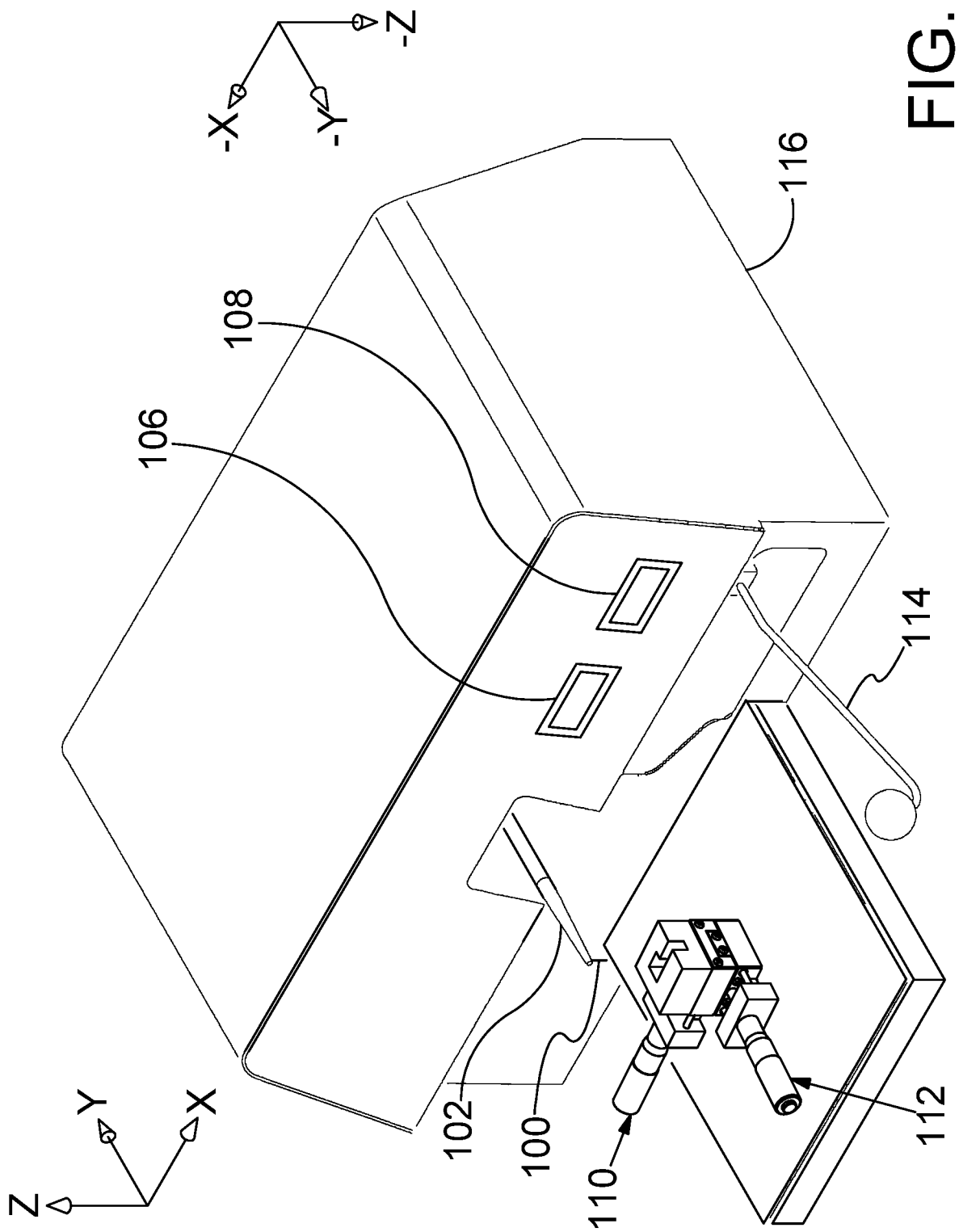
FIG. 7 is a perspective view showing an example system comprising a chassis, a workpiece holder, and a tool holder.

FIG. 7 is a perspective view showing an example system 128 comprising a chassis 116, a workpiece holder 104, and a tool holder 102. In the example embodiment of FIG. 7, the chassis 116 comprises a base portion 146 supporting the workpiece holder 104. A tool holder 102 of the system 128 can be seen holding a tool 100 above the workpiece holder 104 in FIG. 7. In some embodiments, the tool holder 102 of the system 128 supports a tool heater 120 and a tool temperature sensor 122. The example system 128 of FIG. 7 may be used to create parts with void features such as holes, cavities, channels, and the like.

In the example embodiment of FIG. 7, the system 128 includes a tool temperature controller 106 and a workpiece temperature controller 108. In some embodiments, the tool temperature controller 106 is operatively connected to a tool heater 120 supported by the tool holder 102. In some embodiments, the tool temperature controller 106 and the tool heater 120 are capable of heating the tool 100 to a working temperature greater than 400 degrees F. Still referring to FIG. 7, in some embodiments, the workpiece temperature controller is operatively connected to one or more workpiece heaters of the workpiece holder 104. In some embodiments, the workpiece temperature controller 108 and the workpiece heater(s) are capable of heating a workpiece to a selected temperature.

With continuing reference to FIG. 7, it will be appreciated that an XY table 150 of the system 128 is positioned between the workpiece holder 104 and the base portion 146 of the chassis 116. The XY table 150 comprises an X-axis positioner 110 and a Y-axis positioner 112 in the example embodiment of FIG. 7. The tool holder 102 is coupled to a Z-axis positioner 114 that is supported by the chassis 116 in the example embodiment of FIG. 7. The Z-axis positioner 114, the X-axis positioner 110 and the Y-axis positioner 112 form a motion control mechanism 126 of the system 128 in the example embodiment of FIG. 7. In some embodiments, the motion control mechanism 126 capable of producing relative motion between the workpiece holder 104 and the tool 100. Accordingly, the relative positions of the workpiece holder 104 and the tool 100 can be different than the example positions shown in FIG. 7.

Figure 8:
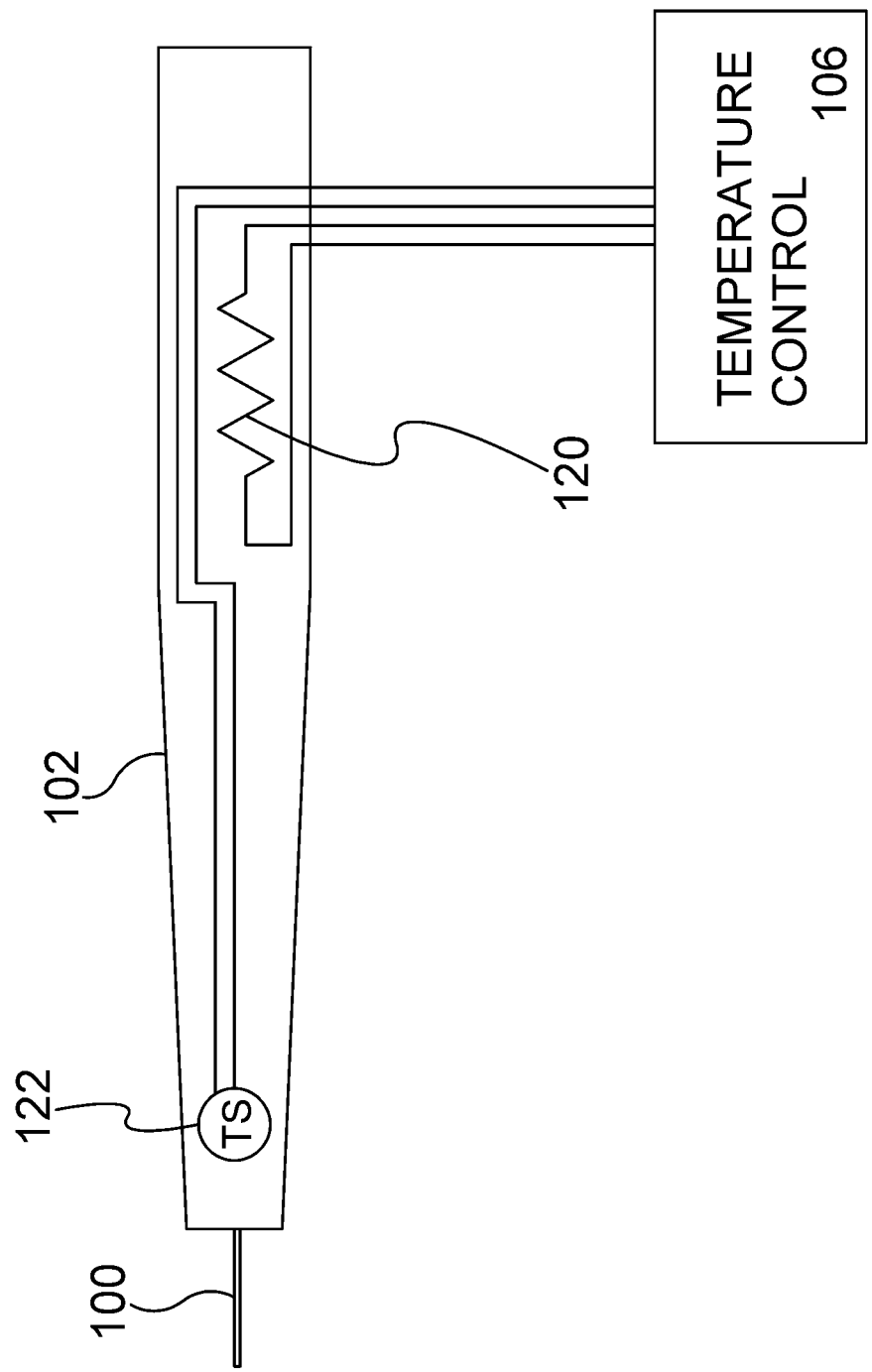
FIG. 8 is a stylized diagram showing an assembly that may form part of a system capable of forming void features such as holes, cavities, channels, and the like in parts/materials.

FIG. 8 is a stylized diagram showing an assembly that may form part of a system 128 capable of forming void features such as holes, cavities, channels, and the like. The system 128 of FIG. 8 includes the tool holder 102 supporting a tool 100, a tool heater 120 and a tool temperature sensor 122. A tool temperature controller 106 is operatively connected to the tool heater 120 and the tool temperature sensor 122 in the example embodiment of FIG. 8. In some embodiments, the tool temperature controller 122 and the tool heater 120 are capable of heating the tool 100 to a working temperature greater than 400 degrees F.

Figure 9:
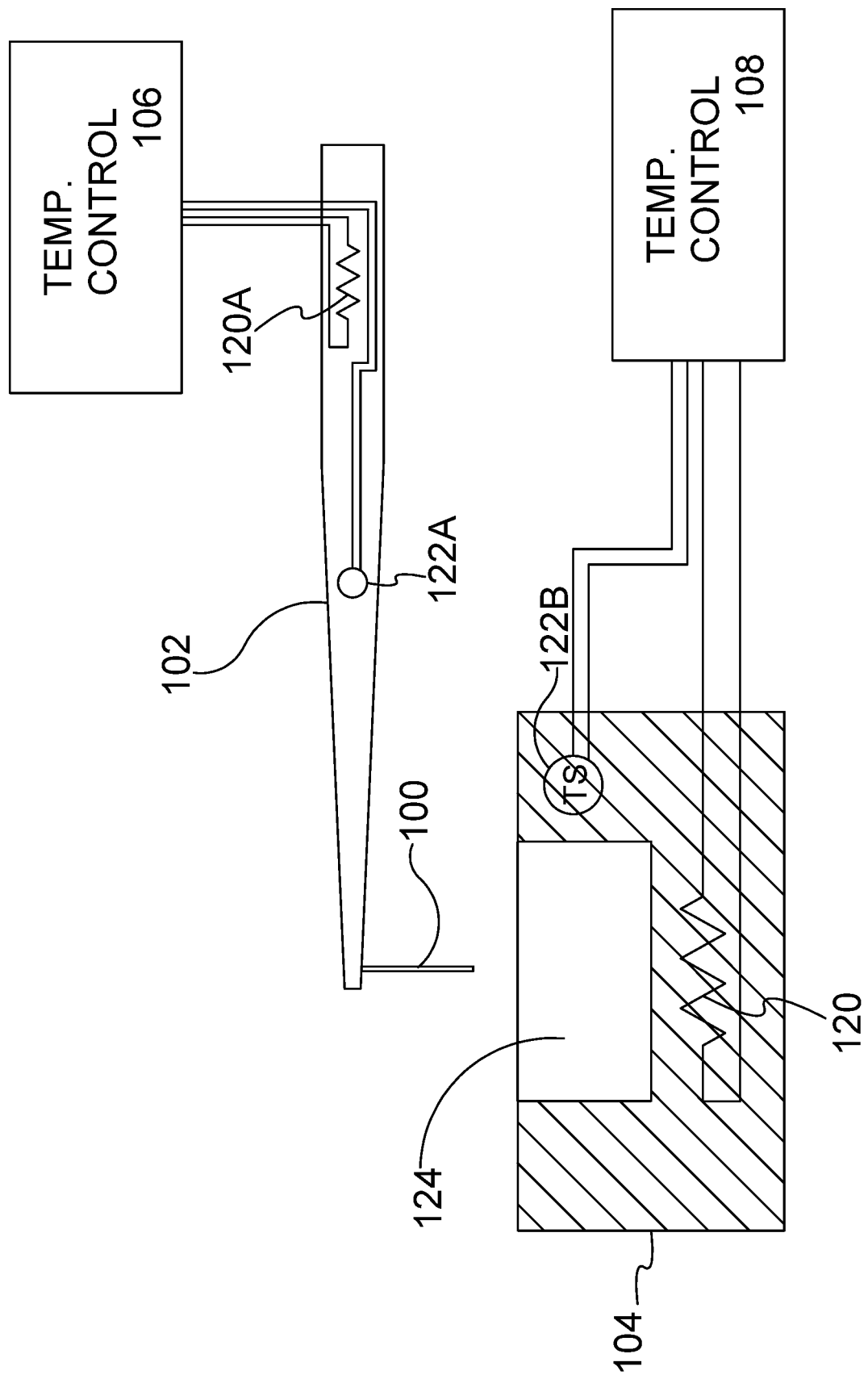
FIG. 9 is a stylized diagram showing portions of a system 128 including a tool holder 102 and a workpiece holder 104.

FIG. 9 is a stylized diagram showing portions of a system 128 including a tool holder 102 and a workpiece holder 104. The example system 128 of FIG. 9 may be used to create parts with void features such as holes, cavities, channels, and the like. In the example embodiment of FIG. 9 the workpiece holder 104 of system 128 supports a workpiece heater 120A and a workpiece temperature sensor 122A. A workpiece temperature controller 108 is operatively connected to the workpiece heater 120A and the workpiece temperature sensor 122A in the example embodiment of FIG. 9. In some embodiments, the workpiece temperature controller 108 and the workpiece heater 120A are capable of heating the workpiece holder 104 to a selected working temperature. The system 128 of FIG. 9 also includes the tool holder 102 supporting a tool 100, a tool heater 120B and a tool temperature sensor 122B. A tool temperature controller 106 is operatively connected to the tool heater 120B and the tool temperature sensor 122B in the example embodiment of FIG. 9. In some embodiments, the tool temperature controller 122B and the tool heater 120B are capable of heating the tool 100 to a working temperature greater than 400 degrees F.

The tool heater and the workpiece heater may comprise various heating elements without deviating from the spirit and scope of the present disclosure. Examples of heating elements that may be suitable in some applications are disclosure in the following United States patents, all of which are hereby incorporated by reference herein: U.S. Pat. Nos. 3,080,543, 3,252,122, 3,307,135, 3,678,249, 3,927, 301, 4,763,102, 5,034,595, 5,247,158, 5,575,941, 6,124,579, and 6,414,281.

The tool temperature sensor and the workpiece temperature sensor may comprise various temperature sensing elements without deviating from the spirit and scope of the present disclosure. Examples of heating elements that may be suitable in some applications are disclosure in the following United States patents, all of which are hereby incorporated by reference herein: U.S. Pat. Nos. 4,934,831, 4,990,193, 5,111,002, 5,176,451, 5,251,981, 5,446,437, 5,689,087, 5,711,608, 5,726,624, 5,808,233, 6,072,165, and 7,982,580.

The tool temperature controller and the workpiece temperature controller may comprise various temperature controlling elements without deviating from the spirit and scope of the present disclosure. Examples of heating elements that may be suitable in some applications are disclosure in the following United States patents, all of which are hereby incorporated by reference herein: U.S. Pat. Nos. 3,946,200, 3,988,682, 4,409,662, 4,631,626, 4,736,091, 4,885,456, 4,933,535, 5,280,422, 5,926,390, 5,951,900, 6,005,577, and 6,688,532.

Figure 10:
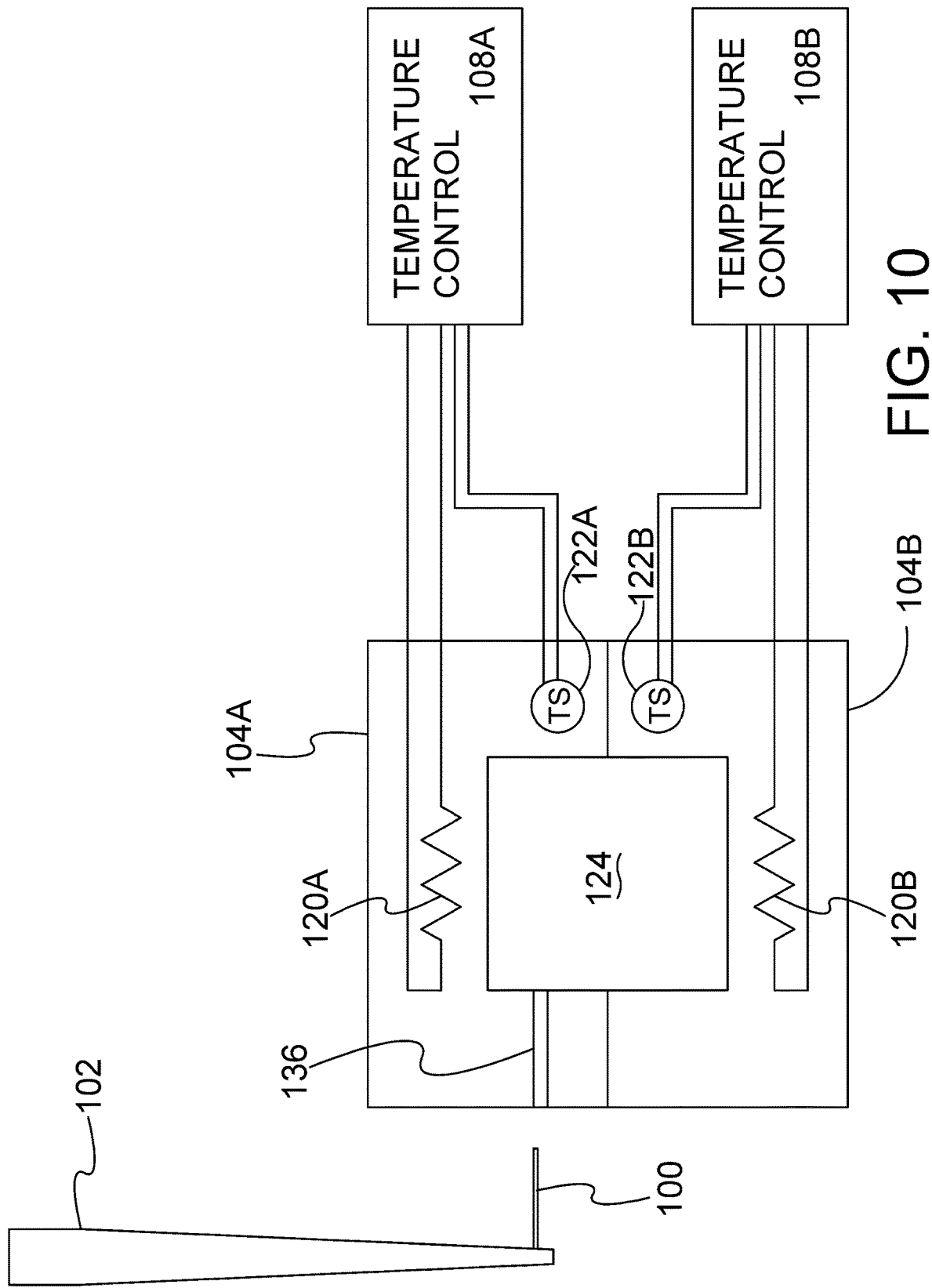
FIG. 10 is a stylized diagram showing a workpiece holder including a first part and a second part that cooperate to define a cavity.

FIG. 10 is a stylized diagram showing a workpiece holder 104 that may be part of a system 128 for creating parts with void features such as holes, cavities, channels, and the like. In the example embodiment of FIG. 10 the workpiece holder 104 comprises a first part 134A and a second part 134B. With reference to FIG. 10, it will be appreciated that the first part 134A and the second part 134B cooperate to define a cavity 124. In some embodiments, the cavity 124 is dimensioned and configured to receive a part or workpiece.

In the example embodiment of FIG. 10, the first part 134A of the workpiece holder 104 supports a first workpiece heater 120A and a first workpiece temperature sensor 122A. A first workpiece temperature controller 108A is operatively connected to the first workpiece heater 120A and the first workpiece temperature sensor 122A in the example embodiment of FIG. 10. With continuing reference to FIG. 10, it will be appreciated that the second part 134B of the workpiece holder 104 supports a second workpiece heater 120B and a second workpiece temperature sensor 122B. A second workpiece temperature controller 108B can be seen operatively connected to the second workpiece heater 120B and the second workpiece temperature sensor 122B in FIG. 10. In some embodiments, the cavity 124 defined by the first part 134A and the second part 134B is dimensioned and configured to receive a workpiece and heating the workpiece to a selected working temperature.

In the example embodiment of FIG. 10, the first part 134B defines a tool passage 136 that is disposed in fluid communication with the cavity 124. In some embodiments, the tool passage 136 allows the distal end of a tool 100 to pass into the cavity 124. In FIG. 1, a tool holder 102 can been seen holding the tool 100 at a location opposite the tool passage 136 defined by the first part 134B. In some embodiments, the tool holder 102 of the system 128 supports a tool heater 120 and a tool temperature sensor 122. In some embodiments, the system 128 includes a motion control mechanism capable of producing relative motion between the workpiece holder 104 and the tool 100. For example, the relative motion may cause the distal end of tool 100 to pass through the tool passage 136 into the cavity 124.

Figure 11:
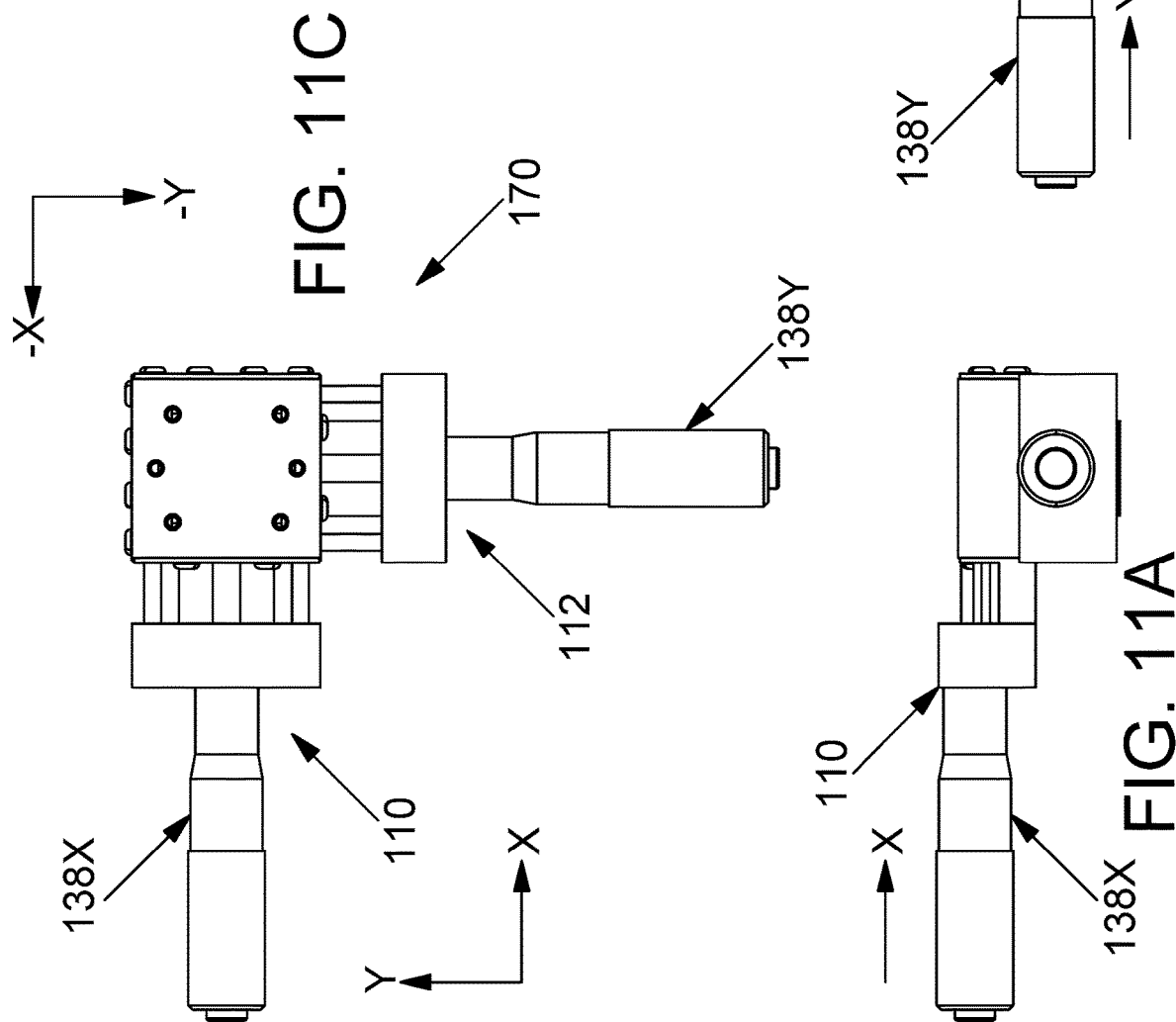
FIG. 11A through FIG. 11C are elevation and plan views showing three sides of an XY table assembly.

FIG. 11A through FIG. 11C are elevation and plan views showing three sides of an XY table assembly 170. Engineer graphics textbooks generally refer to the process used to create views showing six sides of a three-dimensional object as multiview projection or orthographic projection. It is customary to refer to multiview projections using terms such as front view, right side view, top view, rear view, left side view, and bottom view. In accordance with this convention, FIG. 11A may be referred to as a front view of the XY table assembly 170, FIG. 11B may be referred to as a right side view of the XY table assembly 170, and FIG. 11C may be referred to as a top view of the XY table assembly 170. FIG. 11A through FIG. 11C may be referred to collectively as FIG. 11. Terms such as front view and top view are used herein as a convenient method for differentiating between the views shown in FIG. 11. It will be appreciated that the elements shown in FIG. 11 may assume various orientations without deviating from the spirit and scope of this detailed description. Accordingly, the terms front view, right side view, top view, rear view, left side view, bottom view, and the like should not be interpreted to limit the scope of the invention recited in the attached claims.

In the example embodiment of FIG. 11, the XY table assembly 170 comprises an X-axis positioner 110 and a Y-axis positioner 112. In the example embodiment of FIG. 11, the Y-axis positioner 112 includes a screw mechanism 138$y$ and the X-axis positioner 110 includes a screw mechanism 138$x$. The screw mechanisms are configured to convert rotation motion input motions into translational output motions in the example embodiment of FIG. 11. Rotation of a handle portion of the screw mechanism 138$y$ produces forward and/or backward movement of a table portion of the XY table assembly 170. Rotation of a handle portion of the screw mechanism 138$y$ produces movement of the XY table assembly 170 table portion to the left and/or to the right.

Figure 12:
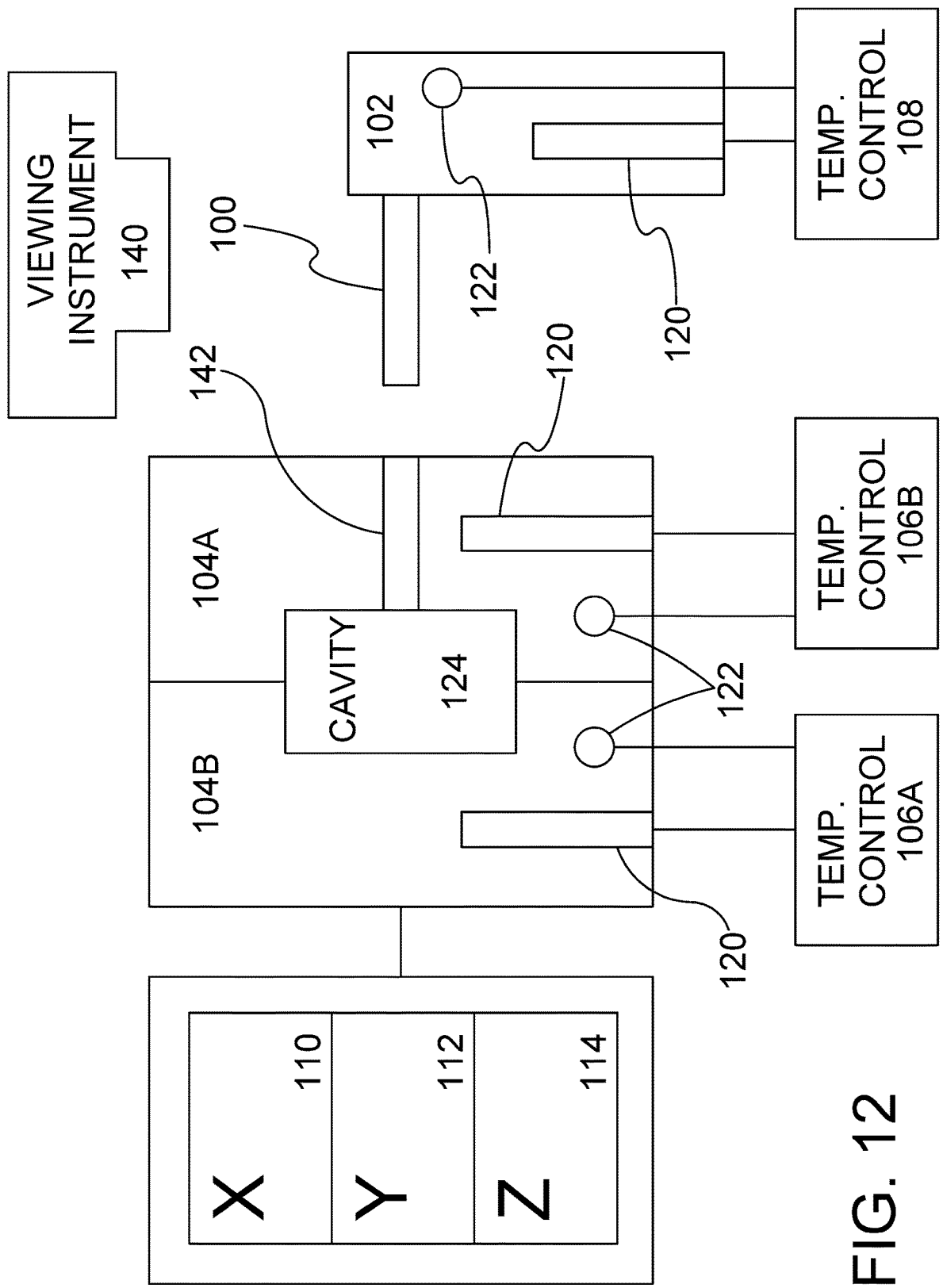
FIG. 12 illustrates an example system that is capable of forming void features such as holes, cavities, channels, and the like in parts/material.

FIG. 12 illustrates an example system 128 that is capable of forming void features such as holes, cavities, channels, and the like in parts/material. The illustration shown in FIG. 12 is not meant to imply physical or architectural limitations to the manner in which an illustrative embodiment may be implemented. Other components in addition to or in place of the ones illustrated may be used. Some components may be optional. Also, some blocks may illustrate functional components. One or more of these blocks may be combined, divided, or combined and divided into different blocks in some implementations.

FIG. 13A, FIG. 13B FIG. 13C, and FIG. 13D form a sequence of stylized cross-sectional views illustrating exemplary methods in accordance with this detailed description. FIG. 13A, FIG. 13B FIG. 13C, and FIG. 13D may be collectively referred to as FIG. 13. A tool 100 and a workpiece 160 are shown in FIG. 13. The workpiece 160 comprises a material 158 and the tool may be used for forming one or more voids in the material 158. A proximal portion of the tool 100 is fixed to a tool holder 102 in the example embodiment FIG. 13.

In FIG. 13A, a tool 100 can be seen located above the workpiece 160 and FIG. 13B illustrates the position of the distal surface 156 of the tool 100 after the tool 100 has moved in a downward direction −Z relative to the position shown in FIG. 13A. In some example embodiments, a method in accordance with this detailed description includes providing a tool having a distal surface, heating the tool to a working temperature, and producing a first relative motion between the workpiece and the tool so that the distal surface of the tool advances into the material while eroding material proximate the distal surface of the tool to form a void in the workpiece without deflecting the material or the workpiece.

FIG. 13C illustrates the position of the distal surface 156 of a tool 100 after the tool 100 has moved further in the downward direction −Z relative to the position shown in FIG. 13B. Some example methods disclosed herein may include the formation of a blind hole and/or channel in the material 158 of the workpiece 160. A method in accordance with some embodiments may comprise forming a void having a cylindrical shape and a diameter less than 0.010 inch. In some example methods, a method in accordance with this detailed description may comprise forming a void having a cylindrical shape and a depth to diameter ratio greater than 10:1. In some example methods, a method in accordance with this detailed description may comprise forming a void having a non-circular lateral cross-sectional shape and a depth to width ratio greater than 10:1.

FIG. 13D illustrates the position of the distal surface 156 of the tool 100 after the tool 100 has moved further in the downward direction −Z relative to the position shown in FIG. 13C. In the example embodiment of FIG. 13D, a distal portion of the tool 100 can be seen extending downward beyond a lower surface of the workpiece 160. Some example methods disclosed herein may include the formation of a through-hole and/or slot in the material 158 of the workpiece 160.

FIG. 14A, FIG. 14B and FIG. 14C form a sequence of stylized perspective views illustrating exemplary methods in accordance with this detailed description. FIG. 14A, FIG. 14B, and FIG. 14C may be collectively referred to as FIG. 14. A tool 100 and a workpiece 160 are shown in FIG. 14. The workpiece 160 comprises a material 158 and the tool may be used for forming one or more voids in the material 158. A proximal portion of the tool 100 is fixed to a tool holder 102 in the example embodiment FIG. 14.

In FIG. 14A, a tool 100 can be seen located above the workpiece 160 and FIG. 14B illustrates the position of the distal surface 156 of the tool 100 after the tool 100 has moved in a downward direction −Z relative to the position shown in FIG. 14A. In some example embodiments, a method in accordance with this detailed description includes providing a tool having a distal surface, heating the tool to a working temperature, and producing a first relative motion between the workpiece and the tool so that the distal surface of the tool advances into the material while eroding material proximate the distal surface of the tool to form a void in the workpiece without deflecting the material or the workpiece.

FIG. 14C illustrates the position of the tool 100 after the tool 100 has moved in a second lateral direction −X relative to the position of the tool 100 shown in FIG. 14B. With reference to FIG. 14C, it will be appreciated that the tool has formed a slot in the material 158 of the workpiece 160. In some example embodiments, a method in accordance with this detailed description includes producing a second relative motion between the workpiece and the tool so that the tool moves in a second direction through the material while eroding material proximate an outer surface of the tool to form the slot in the workpiece without deflecting the material or the workpiece. In some example embodiments, the second relative motion has a second direction that is orthogonal to a first direction of the first relative motion. In the example embodiment of FIG. 14, the second lateral direction −X is orthogonal to the downward direction −Z.

Referring to FIGS. 1 through 14, a system 128 in accordance with this detailed description may comprise a tool holder 102 supporting a tool 100 and a tool heater 120. Additionally, in some embodiments, the system 128 includes a workpiece holder 104 defining a cavity 124. In some embodiments, the cavity 124 is dimensioned and configured to receive at least a portion of a workpiece. In some embodiments, the system 128 is capable of forming a void in the workpiece while the workpiece is held by the workpiece holder 104. The void features formed by the system 128 may be holes, cavities, channels, and the like.

Still referring to FIGS. 1 through 14, in some embodiments, the system 128 includes a tool temperature controller 106 that is operatively connected to the heater supported by the tool holder 102. In some embodiments, the tool temperature controller 106 and the tool heater 120 are capable of heating the tool 100 to a working temperature greater than 400 degrees F.

Still referring to FIGS. 1 through 14, in some embodiments, the system 128 includes one or more workpiece heaters operatively coupled to the workpiece holder 104. In some embodiments, the system 128 includes a workpiece temperature controller 108 that is operatively connected to each workpiece heater 130. In some embodiments, the workpiece temperature controller 108 and the workpiece heater 130 are capable of heating the workpiece to a selected temperature. In some embodiments, the system 128 includes a motion control system 128 capable of producing relative motion between the workpiece holder 104 and the tool 100. The motion control system 128 may include an X-axis positioner 110, a Y-axis positioner 112 and/or a Z-axis positioner 114.

Still referring to FIGS. 1 through 14, in some embodiments, tool 100 comprises a tool body 152 having a cylindrical shape. In some embodiments, the tool 100 has a cylindrical outer surface and a flat distal surface 156. In some embodiments, the tool 100 has a length, a diameter, and an aspect ratio of length to diameter greater than 10. In some embodiments, the tool 100 has an aspect ratio of length to diameter is greater than 15. In some embodiments, the tool 100 has an aspect ratio of length to diameter is greater than 20. In some embodiments, the tool 100 comprises a tool material having a thermal conductivity greater than 375 W/m K. In some embodiments, the tool 100 comprises a tool material having a thermal conductivity greater than 400 W/m K.

Still referring to FIGS. 1 through 14, in some embodiments, a method for forming a void in a workpiece comprises providing a tool having a distal surface, heating the tool to a working temperature, and producing a first relative motion between the workpiece and the tool so that the distal surface of the tool advances into the material while eroding material proximate the distal surface of the tool to form the void in the workpiece without deflecting the material or the workpiece. In some example methods, eroding material comprises burning material and the working temperature is greater than or equal to a spontaneous combustion temperature of the material. In some example methods, eroding material comprises vaporizing material and the working temperature is greater than or equal to a vaporization temperature of the material.

Still referring to FIGS. 1 through 14, in some embodiments, a method for forming a void in a workpiece comprises producing a second relative motion between the workpiece and the tool so that the tool travels in a second direction through the material while eroding material proximate an outer surface of the tool to form the slot in the workpiece without deflecting the material or the workpiece. In some example embodiments the second relative motion has a second direction that is orthogonal to a first direction of the first relative motion.

Still referring to FIGS. 1 through 14, in some example embodiments, the tool has a cylindrical shape. In some example embodiments, the tool has a cylindrical outer surface and a flat distal surface. In some example embodiments, the tool has a length, a width, and an aspect ratio of length to width greater than 10:1. In some example embodiments, the tool has a length, a width, and an aspect ratio of length to width greater than 15:1. In some example embodiments, the tool has a length, a width, and an aspect ratio of length to width greater than 20:1. In some example embodiments, the tool comprises a tool material having a thermal conductivity greater than 375 W/m K. In some example embodiments, wherein the tool comprises a tool material having a thermal conductivity greater than 400 W/m K. In some example embodiments, wherein the tool comprises a tool material having a thermal conductivity greater than 250 W/m K. In some example embodiments, the tool comprises copper or copper alloy. In some embodiments, the tool comprises an elongate member having a cylindrical shape, a diameter less than 0.010 inch and length to diameter ratio greater than 10:1.

Still referring to FIGS. 1 through 14, in some embodiments, a method for forming a void in a workpiece comprises heating the workpiece to a holder temperature, the holder temperature being less than the working temperature and greater than about 200 degrees F. Some example methods include heating the workpiece to a holder temperature, the holder temperature being less than the working temperature and greater than about 300 degrees F. Some example methods include heating the workpiece to a holder temperature, the holder temperature being less than the working temperature and greater than about 350 degrees F. Some example methods include heating the workpiece to a holder temperature, the holder temperature being less than the working temperature and greater than about 380 degrees F.

Still referring to FIGS. 1 through 14, in some embodiments, a method for forming a void in a workpiece comprises the step of providing the workpiece and the workpiece comprises a material that is pliable, resilient, and/or elastomeric. In some examples, the workpiece comprises silicone rubber. In some example methods, the material comprises silicone elastomer and the working temperature is greater than about 410 degrees F. In some example methods, the material comprises silicone elastomer and the working temperature is greater than about 400 degrees F. In some example methods, the material comprises silicone elastomer and the working temperature is greater than about 390 degrees F. In some example methods, the material comprises silicone elastomer and the working temperature is greater than about 410 degrees F.

Still referring to FIGS. 1 through 14, in some embodiments, a method for forming a void in a workpiece comprises eroding material to form a void having a cylindrical shape, a diameter less than 0.010 inch and a depth to diameter ratio greater than 10:1. In some embodiments, a method for forming a void in a workpiece comprises eroding material to form a void having a cylindrical shape and a depth to diameter ratio greater than 15:1. In some embodiments, a method for forming a void in a workpiece comprises eroding material to form a void having a cylindrical shape and a depth to diameter ratio greater than 20:1. In some embodiments, a method for forming a void in a workpiece comprises eroding material to form a void having a prism shape and a depth to width ratio greater than 10:1. In some embodiments, a method for forming a void in a workpiece comprises eroding material to form a void having a prism shape and a depth to width ratio greater than 15:1. In some embodiments, a method for forming a void in a workpiece comprises eroding material to form a void having a prism shape and a depth to width ratio greater than 20:1. In some embodiments, a method for forming a void in a workpiece comprises eroding material to form a void having a cylindrical shape and a diameter less than 0.006 inch.

The following United States patents are hereby incorporated by reference herein: U.S. Pat. Nos. U.S. Pat. Nos. 3,080,543, 3,252,122, 3,307,135, 3,678,249, 3,927,301, 4,763,102, 5,034,595, 5,247,158, 5,575,941, 6,124,579, 6,414,281, 4,934,831, 4,990,193, 5,111,002, 5,176,451, 5,251,981, 5,446,437, 5,689,087, 5,711,608, 5,726,624, 5,808,233, 6,072,165, 7,982,580, 3,946,200, 3,988,682, 4,409,662, 4,631,626, 4,736,091, 4,885,456, 4,933,535, 5,280,422, 5,926,390, 5,951,900, 6,005,577, and 6,688,532.

The above references to U.S. patents in all sections of this application are herein incorporated by references in their entirety for all purposes. Components illustrated in such patents may be utilized with embodiments herein. Incorporation by reference is discussed, for example, in MPEP section 2163.07(B).

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

The invention claimed is:

1. A machine for forming a void in a workpiece, the workpiece comprising a material, the machine comprising:
 a workpiece holder defining a cavity and a tool passage in fluid communication with the cavity, the cavity being dimensioned and configured to receive at least a portion of the workpiece;
 a tool holder supporting a tool and a heater, the tool having a distal tip with a flat distal surface;
 a temperature controller operatively connected to the heater configured to heat the tool to a working temperature, wherein the working temperature is greater than or equal to a vaporization temperature of the material;

a workpiece heater supported by the workpiece holder;

a workpiece temperature sensor supported by the workpiece holder; and a workpiece temperature controller operatively coupled to the workpiece heater and the workpiece temperature sensor; and one or more positioning mechanisms capable of producing relative motion in at least two distinct axes between the workpiece holder and the tool, the distal tip of the tool being configured to pass through the tool passage and into the cavity prior to contacting the workpiece, wherein the material is a silicone elastomer.

2. The machine of claim 1 wherein the tool has a proximal portion fixed to the tool holder and an elongate body extending away from the tool holder to a free distal end of the tool.

3. The machine of claim 1 wherein the tool has a cylindrical shape and a diameter less than 0.010 inches.

4. The machine of claim 1 further comprising a viewing instrument, the viewing instrument being positioned so that a distal end of the tool is within a field of view of the viewing instrument, the viewing instrument comprising a binocular inspection scope or a digital camera.

5. The machine of claim 1 wherein the tool comprises a tool material having a thermal conductivity greater than 375 W/m K.

6. The machine of claim 1 further comprising a temperature sensor supported by the tool holder, the temperature sensor being operatively coupled to the temperature controller.

7. A machine for forming a void in a workpiece, the workpiece comprising a material, the machine comprising:

a workpiece holder having a first part and a second part, the first and second parts cooperating to define a cavity, the cavity being dimensioned and configured to receive at least a portion of the workpiece;

a first workpiece heater supported by the first part of the workpiece holder;

a first workpiece temperature sensor supported by the first part workpiece holder;

a first workpiece temperature controller operatively coupled to the first workpiece heater and the first workpiece temperature sensor, the first workpiece temperature controller configured to heat a first portion of the cavity to a first working temperature;

a second workpiece heater supported by the second part of the workpiece holder;

a second workpiece temperature sensor supported by the second part of the workpiece holder; and a second workpiece temperature controller operatively coupled to the second workpiece heater and the second workpiece temperature sensor, the second workpiece temperature controller configured to heat a second portion of the cavity to a second working temperature;

a tool holder supporting a tool and a tool heater, the tool comprises a tool material having a thermal conductivity greater than 375 W/m K;

a tool temperature controller operatively connected to the tool heater configured to heat the tool to a working temperature, wherein the working temperature is greater than or equal to a spontaneous combustion temperature of the material; and one or more positioning mechanisms capable of producing relative motion between the workpiece holder and the tool, wherein the material is elastomeric.

\* \* \* \* \*